Figure 1:
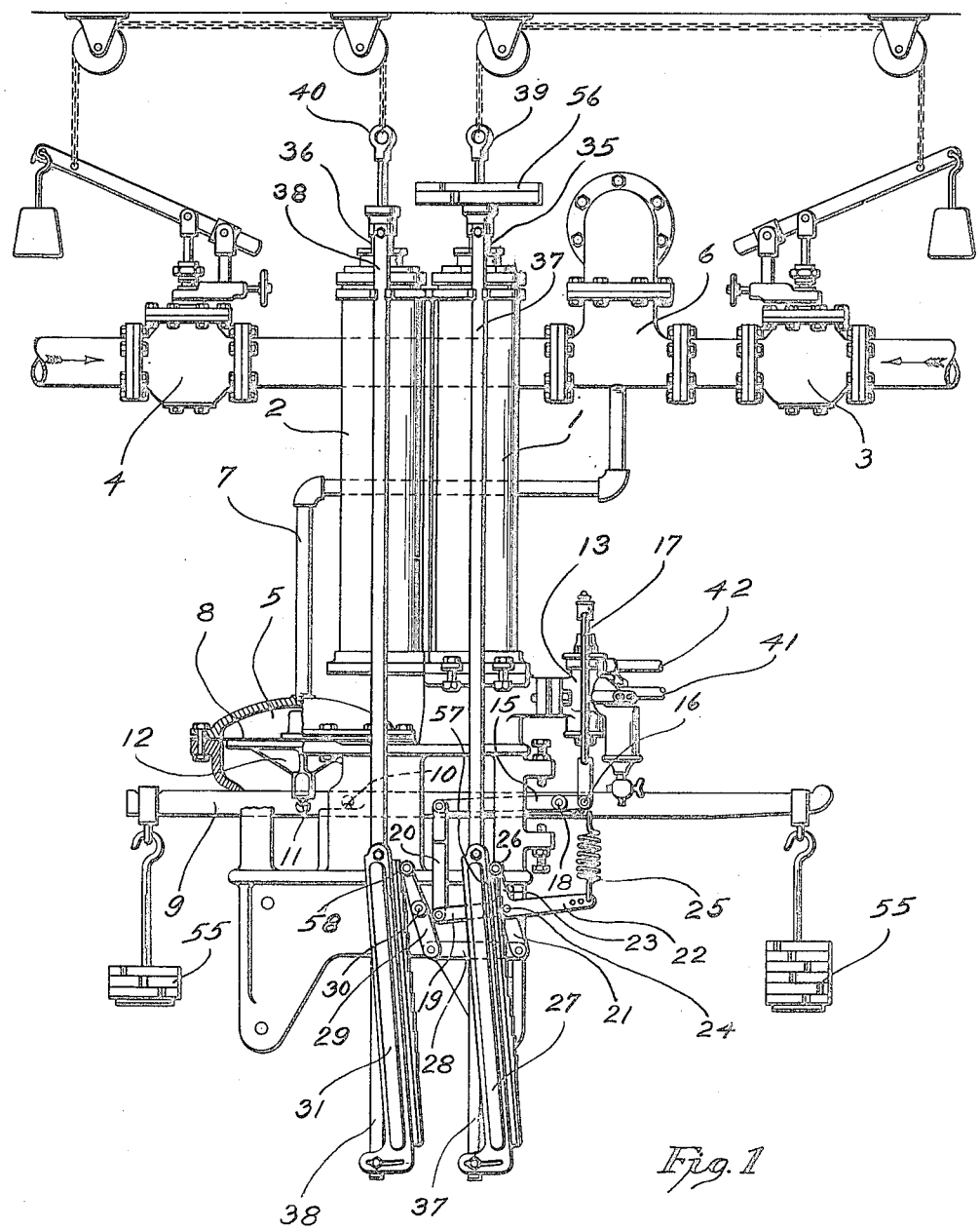

Patented Apr. 2, 1929.

1,707,955

UNITED STATES PATENT OFFICE.

JAMES LEWIS KIMBALL, OF BEVERLY, MASSACHUSETTS, ASSIGNOR TO RUGGLES. KLINGEMANN MANUFACTURING COMPANY, OF SALEM, MASSACHUSETTS.

FLUID-PRESSURE REGULATOR.

Application filed March 18, 1926. Serial No. 95,698.

My invention relates to a regulator for controlling the conditions of a fluid such as controlling the temperature or pressure. It particularly relates to a regulator for controlling two controlling elements independently in progressive order, the operation of said elements affecting the condition of the fluid in a fluid system.

The principal object of my invention is to provide means whereby the controlling elements will tend to be accentuated at different positions in their operation corresponding to the value of the condition of the fluid in the system.

More specifically my invention comprises improvements in regulators in which dual relay motor (sometimes called servo motors) are employed for the control of fluid pressure, said improvements consists in providing each motor with a compensating attachment with novel means for interconnecting said attachments thereby obtaining a co-operating effect between the motor in operation and the pressure device to prevent over travel of the motors, which otherwise would result in over correction and hunting action. One of the common applications of a dual motor control is in the selective operation of exhaust and live steam valves, but heretofore no means has been provided for compensating the operation of the motor which controlled the exhaust steam valve, therefore it was impossible to prevent the non-compensated motor from overtravelling and operating with a hunting action. My invention comprises novel compensating arrangement with a coacting effect between the motor in operation, the pressure device and the motor governing element, and also provides means whereby the operation of the compensating arrangement is automatically shifted from one motor to the other upon the completion of the limit of operation of either motor. While I have illustrated and am about to describe my invention in connection with the operation fluid pressure valve, it should be understood that dual motor regulators are used for other purposes such as the control of rheostats and dampers, and my invention is equally applicable to regulators of this class regardless of service which they perform.

I am well aware of the fact that controlled apparatus having two motors and a single governing element with means for controlling the operation of the governing element from the condition of the fluid in the system is old in the art, but as far as I am aware the compensating arrangement for jointly controlling the governing device from the motor and from the condition of the fluid in the system has never been applied to but one motor. My invention, therefore, resides in compensating the operation of both motors so that both controlling elements will be accentuated at positions corresponding closely to the condition of the fluid in the system but independently in progressive order.

Referring to the drawing, Figure 1 represents a vertical elevation of my invention and shows the two motors (1) and (2) controlling two valves (3) and (4).

Figure 2:
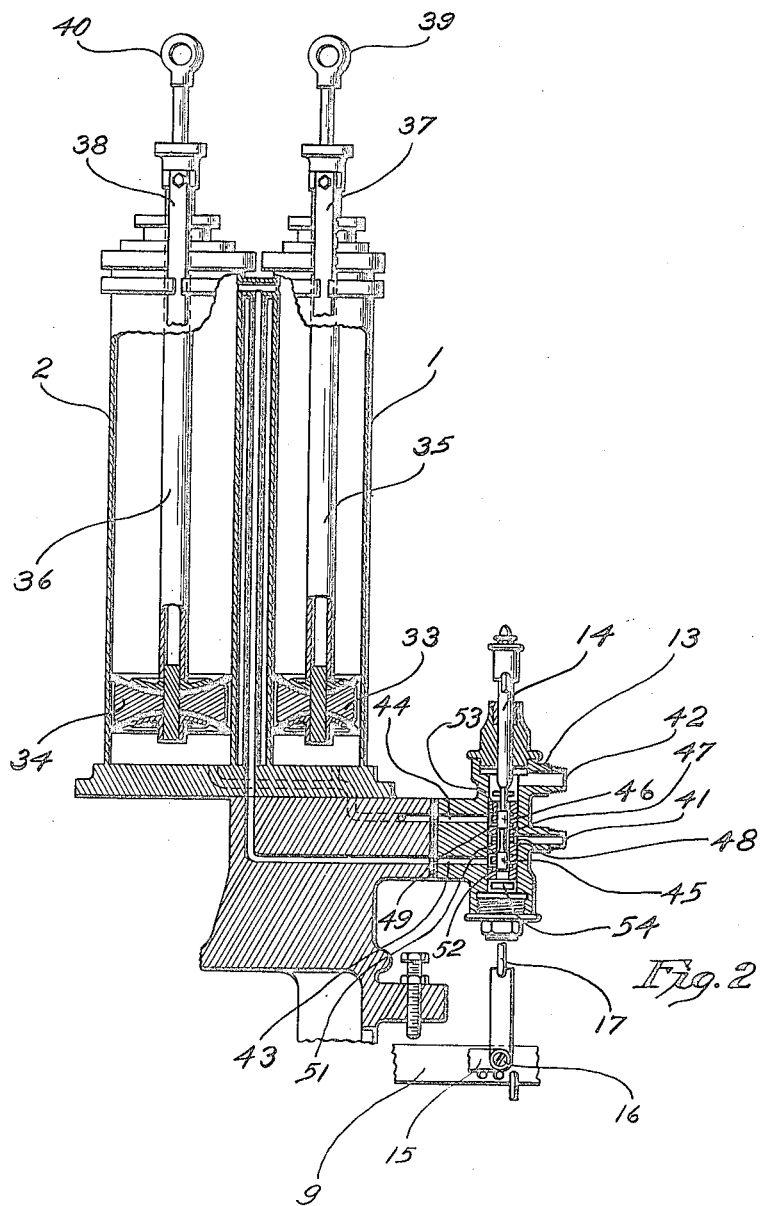

Figure 2 represents a vertical section of two fluid pressure motors and the governing element, the motors 1 and 2 correspond to motors 1 and 2 in Fig. 1, but motor 2 is shown larger than motor 1, for the purpose hereinafter explained.

Referring to Figure 1 (5) is a pressure chamber and is connected to the low pressure system (6) by means of pipe (7). (8) is a flexible diaphragm which transmits variation in pressure in the chamber (5) to a beam (9). Beam (9) is pivoted at point (10) and is acted upon at point (11) by means of a pressure cap (12) which engages both the beam (9) and diaphragm (8). A governing element (13) consists of a pilot valve, said valve having a neutral position in which it is not effective, and two effective positions in which are controlled the operation of the motors (1) and (2) which operation will be explained later. The stem (14) see Fig. 2, of this valve is connected to a lever (15) at point (16) by means of a yoke (17). The lever (15) is pivoted to the beam (9) at point (18). The yoke (17) and valve stem (14) is, therefore, moved up and down by the movement of beam (9). The left hand end of the lever (15) is connected to arm (19) by means of a link (20). Arms (19), (21), (22), and (23) are all pivoted on shaft (24) and are rocked simultaneously on this stationary pivoted point. Arm (22) has a spring (25) which connects with beam (9). Arm (23) has a roll (26) which is held in engagement with the stepped bar (27) by the spring (25). Arm (21) has a connecting link (28) which connects with roll arm (29) having stationary pivoted point (30) and this arm is also held in contact with stepped bar (31) by means of the spring (25). These step bars (27) and (31) move up and down with the movement of the motor plunger as will hereinafter be explained.

Referring to Fig. 2, the two fluid pressure motors (1) and (2) have pistons (33) and (34) and piston rods (35) and (36). These piston rods extend upward through stuffing boxes at the top of the cylinders and the outside end is connected with bars (37) and (38) which operate the step bars (27) and (31). The upper end of the piston rods are also provided with connecting eyes (39) and (40) for chain connection for operating the controlling valves (3) and (4).

The comparative size of the motor cylinders can be varied as shown in Fig. 2, to properly proportion the power required to operate valves of varying sizes.

The operation of the pilot valve will now be explained. The inlet for fluid pressure is indicated at (41); (42) is the exhaust connection, (43) is a passage leading to the top of the motors and (44) is a passage leading to the bottom of the motors. The valve stem (14) has cylindrical portions (45) and (46) which control the admission and exhaust of fluid pressure to opposite ends of the motors. The stem (14) is shown in a neutral position in which no pressure can be admitted or exhausted to or from the motor cylinders. (47) is a valve bushing having inlet (48) which admits pressure between the two cylindrical portions (45) and (46) of the valve stem (14). When stem (14) is raised, pressure is admitted at port (49) and communicated through passage (44) to the bottom of the motor cylinders; at the same time exhaust port (52) is opened to exhaust, allowing pressure to escape from the top end of the motors and when the stem (14) is lowered, admission (49) and exhaust port (52) is closed, and admission port (51) and exhaust (53) is opened, reversing the motion of the motors.

It will be understood that any pressure escaping from the top end of the motor will be exhausted through port (54) to the top of the pilot valve, where it will go to waste through exhaust port (42).

It will be understood from the foregoing description that an upward movement of valve stem (14) admits pressure under pistons (33) and (34) and effects an upward movement of the piston rods (35) and (36), while a downward movement of stem (14) admits pressure above pistons (33) and (34) and effects a downward movement of the piston rods (35) and (36).

Referring again to Fig. 1, it will be seen that an increase in pressure acting on the diaphragm (8) will effect a raising of the valve stem (14) and likewise a decrease in pressure on the diaphragm (8) will effect a downward movement of the valve stem (14).

It will be understood that the pressure to be maintained on the diaphragm and likewise in the system, is counteracted by the weights (55). The exact pressure to be maintained being balanced by shifting weights (55) from one end of the beam (9) to the other.

I will now explain how these two motors are operated independently of one another in progressive order, step by step. There are several ways in which one of the motors can be held in its initial position until the other motor has completed its full stroke. The most common way is to weight one of the motors. Motor 1 shows weights (56) applied to the top of the piston rod. These weights cause a higher pressure to accumulate under piston (33) than is required to move piston (34), consequently, piston (34) will make its full stroke before sufficient pressure will be accumulated to move piston (33).

My preference is for a locking device which locks one motor in its initial position until the other motor has travelled its full stroke and unlocked the other motor. For this purpose I provide an abutment or recess (57) on the step bar (27) so that when this motor is at its bottom position, the compensating roll (26) will engage this abutment and thereby prevent its respective motor from being moved until the other motor (2) has made a complete stroke and thereby released the motor (1).

In the operation of these motors, assuming an increase in pressure on diaphragm (8) sufficient to overcome weights (55) and spring tension (25), then valve stem (14) will be moved to a pressure position, piston (34) will be moved upward, and through this movement, carrying the bar upward, when the first step reaches the roll (58), arm (29) will be rocked on a pivot (30) which in turn will rock arm (21), (22) and (19), and also arm (23) and slightly move roll (26) outward in its locking position. The rocking of the arm (22) changes the pressure setting of the diaphragm by increasing the tension of spring (25). The rocking of the arm (15), the connecting link (20) being moved upward and the valve yoke (17) downward. This lowers valve stem (14) to its neutral position and retards the further operation of the motor until a further variation in pressure takes place, when the operation will be repeated, the motor making regular stops at each stepped position. Assuming the increase in pressure continued until the piston (34) had completed its full upward stroke, and entirely closed valve (4), the system would now receive pressure through valve (3) only. Roll (26) has now been completely removed from its locking abutment and if the pressure should still continue to rise, valve stem (14) will again be opened to a pressure position and sufficient pressure accumulated under piston (33) to overcome weights (56) and this motor will start to close valve (3) making regular stops on its upward stroke, the same as the other motor, the compensating action now being effected by roll (26) while roll (58) simply moves away from its compensating bar.

Assuming a decrease in pressure to take place with both motors fully extended, and valves closed, then the operation would be as follows:—weights (55) would overcome the pressure on the diaphragm (8) and valve spindle (14) would be lowered, thereby moving the stem to its opposite pressure position which would admit pressure to the upper side of both pistons, but motor (1) having its piston weighted, it will be seen that this motor will be the first to respond, motor (2) being held to its extreme upward position with valve (4) closed. As piston (33) moves downward, the step bar (27) will be moved downward. When the first lower step is reached, arms (23), (22) and (19) will be rocked, but this time in the reverse direction to lessen the tension on spring (25) and to operate arm (15) to raise valve stem (14) and return this valve to a neutral position, and, thereby, to check the further operation of the piston (33) and the further opening of the valve (3), until a further variation in pressure takes place, when the operation will be repeated at the next step position. All the time while piston (33) is moving downward, roll (58) is away from step bar (31) and does not come in contact with this bar until the piston (33) has reached its limit of travel and the roll (26) entered the recess (57) at the top of the step bar (27).

While I have described my invention in connection with stepped angling bars (27) and (31), and consider such an arrangement preferable as such an arrangement produces a step by step action, yet it should be understood that plain faced angling bars could be used in which the operation would be of the well known floating action, the pistons being moved by small indefinite increments of motion, nevertheless, the principle as far as my invention is concerned, would be the same and would come under the scope of my invention.

It will now be seen that I have devised new and useful means for compensating the action of two motors, both motors being controlled from a single governing element, operated by a device responsive to the condition of the fluid in a fluid system.

It will be understood that my invention is not limited to the exact embodiment illustrated and described herein, but includes any means whereby two motors, either fluid pressure motors, or electric motors, may be so governed by a single governing element as to prevent over-travel and hunting action by either motor. With this understanding, the invention is to be regarded as described and illustrated by, but not limited to, the above specifications, and the accompanying drawings, and to be defined by the appended claims, construed as indicated above.

I claim:—

1. In a regulator, two motors, a single governing element means for operating the governing element to operate the motors, means for compensating the operation of the governing element, means interconnecting said compensating means with each of said motors, and means whereby the operation of the compensating means is automatically shifted from one motor to the other upon the completion of the limit of operation of either motor.

2. In a regulator, two motors, a single governing element for said motors, pressure operated means for operating the governing element, means for preventing the operation of one motor until the other motor has completed its limit of operation, means for compensating the operation of the governing element, means interconnecting said compensating means with each of said motors, and means for disengaging the compensating means from the motor which has completed its limit of operation, and automatically shifting the same to the other motor.

3. In a regulator, two fluid pressure motors, means to operate said motors in opposite direction by fluid pressure, a single governing element controlling said operation, pressure operated means for operating the governing element, means for compensating the operation of said governing element from the operation of said motors, means retarding the operation of one motor until the other motor has completed its limit of operation in one direction, and means for disengaging said compensating means from the motor first to complete its operation and automatically shift the operation of said compensating means to the other motor.

4. In a regulator, two motors, a governing element for operating said motors, a pressure responsive device for operating the governing element, compensating means connecting each motor with the governing element whereby the governing element is controlled jointly by the pressure device and by the motor in operation, means for retarding the operation of one motor until the other motor has completed its limit of operation, and means for automatically shifting the joint control of the governing element from one motor to the other upon the second motor commencing to operate.

5. In a regulator, comprising a pressure responsive device, two relay motors, control means jointly operated by said pressure device and each of said motors, means whereby one of said motors is operated first, and means whereby the joint control is automatically shifted to the other motor upon the completion of the limit of operation of either motor.

6. In a regulator comprising two reversible relay motors, a single governing element having a neutral position in which it is ineffective and two effective positions in which it controls a power supply common to each motor, a pressure responsive device, a connection between the pressure responsive device and the governing element whereby variations in pressure acting on the pressure device will operate the governing element to either one or the other of its effective positions, a connection between the governing element and each of said motors co-operating with the first named connection whereby the operation of either motor will return the governing element to a neutral position, and means retarding the operation of one motor until the other has completed its full limit of operation.

7. In a regulator, two motors having predetermined limits of operating in two directions, a single governing element for controlling a power supply common to the operation of both motors, means to operate the governing element to operate the motors, means retarding the operation of one motor until the other motor has completed its limit of operation in one direction, and compensating means interconnected between each of said motors and the governing element arranged to correct the operation of the governing element to cause either motor in operation to normally assume an intermediate position between the limits of operation.

8. In a regulator, two motors having predetermined limits of operation in two directions, a governing element arranged to control a power supply common to the operation of both motors, pressure responsive means for operating said governing element to operate the motors, means retarding one motor until the other motor has completed its limit of operation in one direction, and compensating means interconnected between each of said motors and the governing element arranged to correct the operation of the governing element to cause either motor in operation to normally assume an intermediate position between the limits of operation.

JAMES LEWIS KIMBALL.